United States Patent
Nayak et al.

(10) Patent No.: US 9,547,517 B2
(45) Date of Patent: *Jan. 17, 2017

(54) APPLICATION-SPECIFIC DATA IN-FLIGHT SERVICES ALONG A COMMUNICATION PATH SELECTED BASED ON A DIF SERVICES POLICY ASSOCIATED WITH A VM

(71) Applicant: VMware, Inc., Palo Alto, CA (US)

(72) Inventors: Samdeep Nayak, Sunnyvale, CA (US); Satyam B. Vaghani, San Jose, CA (US); Rajesh Bhat, Sunnyvale, CA (US); Vinay Gaonkar, San Jose, CA (US); Sanjay Vasudev Acharya, Fremont, CA (US); Chiao-Chuan Shih, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,088

(22) Filed: Dec. 22, 2014

(65) Prior Publication Data

US 2015/0106815 A1   Apr. 16, 2015

Related U.S. Application Data

(63) Continuation of application No. 13/371,243, filed on Feb. 10, 2012, now Pat. No. 8,966,479.

(51) Int. Cl.
| | |
|---|---|
| G06F 9/455 | (2006.01) |
| G06F 15/16 | (2006.01) |
| G06F 15/173 | (2006.01) |
| H04L 29/06 | (2006.01) |
| H04L 29/08 | (2006.01) |

(52) U.S. Cl.
CPC ......... *G06F 9/45558* (2013.01); *H04L 67/16* (2013.01); *G06F 2009/45595* (2013.01); *H04L 67/1097* (2013.01)

(58) Field of Classification Search
None
See application file for complete search history.

(56) References Cited

U.S. PATENT DOCUMENTS

| | | |
|---|---|---|
| 2012/0110328 A1 | 5/2012 | Pate et al. |
| 2013/0198808 A1 | 8/2013 | Thomson et al. |
| 2013/0212577 A1 | 8/2013 | Nayak et al. |

OTHER PUBLICATIONS

"Quality-of-Service, The Differentiated Services Model", Cisco Systems, Inc. 2008, 4 pages.
Roman Pletka, Christian Cachin, "Cryptographic Security for a High-Performance Distributed File System", Proceedings of the 24th IEEE Conference on Mass Storage Systems and Technologies, 2007, 13 pages.

(Continued)

*Primary Examiner* — Bing Zhao

(57) ABSTRACT

Embodiments provide data in-flight (DIF) services to software applications such as virtual machines (VMs) at an application level without requiring modification to established storage protocols. In exemplary embodiments, a software application is associated with a DIF services policy indicating one or more DIF services to apply to the software application. Data transmitted by the software application to a destination is tagged based on the DIF services policy associated with the software application and transmitted to the destination.

20 Claims, 9 Drawing Sheets

(56) References Cited

OTHER PUBLICATIONS

"Non-Final Office Action for U.S. Appl. No. 13/371,243", Mailed Date: Feb. 27, 2014, 14 pages.
"Applicant Initiated Interview Summary for U.S. Appl. No. 13/371,243", Mailed Date: Jul. 2, 2014, 3 pages.
"Notice of Allowance and Examiner Initiated Interview Summary for U.S. Appl. No. 13/371,243", Mailed Date: Oct. 2, 2014, 14 pages.

APPLICATION-SPECIFIC DATA IN-FLIGHT SERVICES ALONG A COMMUNICATION PATH SELECTED BASED ON A DIF SERVICES POLICY ASSOCIATED WITH A VM

CROSS-REFERENCE TO RELATED APPLICATION

This application is a continuation of U.S. application Ser. No. 13/371,243, filed Feb. 10, 2012, the entirety of which is hereby incorporated by reference herein.

BACKGROUND

Some computer networks support data in-flight (DIF) services, a set of attributes, transformations, or manipulations that apply to data being transferred between nodes of the network. For example DIF services may be used to provide data integrity, data isolation, data quality of service (QoS), and/or data security (e.g., encryption). In the context of a storage area network (SAN), data generated by software applications is transmitted through a fabric of network nodes to a consolidated data store. The nodes may include, for example, initiators (e.g., host bus adapters, HBAs), network switches, and/or storage controllers in the SAN.

DIF services implementations generally include multiple network nodes working in tandem to accomplish desired results. For example, to provide a QoS guarantee (e.g., a minimum bandwidth and/or a maximum latency), a QoS policy may be enforced by all nodes between a source node and the datastore. Accordingly, a number of DIF services standards have been developed for use by devices along the path of data transmission. However, at least some of these standards do not support virtualization technology and may be unable to distinguish between software applications, such as virtual machines (VMs), executed by a single host. DIF services may therefore be applied to a host based on the DIF services desired for any application executed by that host. For example, if encryption is desired for a first application at a host and QoS is desired for a second application at the host, an operator may apply both encryption and QoS to the host. As a result, both services are applied to the first and second applications, even though the operator has no desire to apply QoS to the first application, or to apply encryption to the second application. Such over-application of DIF services may increase operating overhead in the form of computing resource (e.g., processor time, memory, and/or network bandwidth) utilization at the host and/or elsewhere within the network while providing little or no benefit to the operator.

Conceivably, computing resources may be more efficiently utilized by updating existing standards to apply DIF services to individual applications, and modifying the nodes in a network to support the updated standards. However, modifying multiple network nodes, potentially provided by different vendors, to support updated standards may be infeasible or impossible. For example, modifying the network nodes may impose significant configuration and testing effort. Further, some device vendors may be reluctant to invest the effort to support such updated standards.

SUMMARY

One or more embodiments described herein provide software application (e.g., virtual machine) specific data in-flight (DIF) services without requiring modification to established storage protocols. In exemplary embodiments, each software application in a cluster may be associated with a DIF services policy indicating one or more DIF services to apply to the software application. The software application is executed by a host that satisfies the associated DIF services policy. For example, the software application may be executed at a host that is capable of communicating with a datastore (e.g., a storage array) using a communication path that supports the services indicated in the DIF services policy. When the software application transmits data to a destination, the host tags the data based on the DIF services policy associated with the software application and transmits the tagged data to the destination.

In some embodiments, a host creates a plurality of communication paths between the host and a datastore, with each communication path supporting a different DIF service or combination of DIF services. Data from each software application executed by the host may be transmitted using a communication path selected based on the DIF services policy, if any, associated with the software application. Accordingly, computing resource utilization may be reduced while satisfying user-specified DIF services policies.

This summary introduces a selection of concepts that are described in more detail below. This summary is not intended to identify essential features, nor to limit in any way the scope of the claimed subject matter.

DETAILED DESCRIPTION

Figure 1:
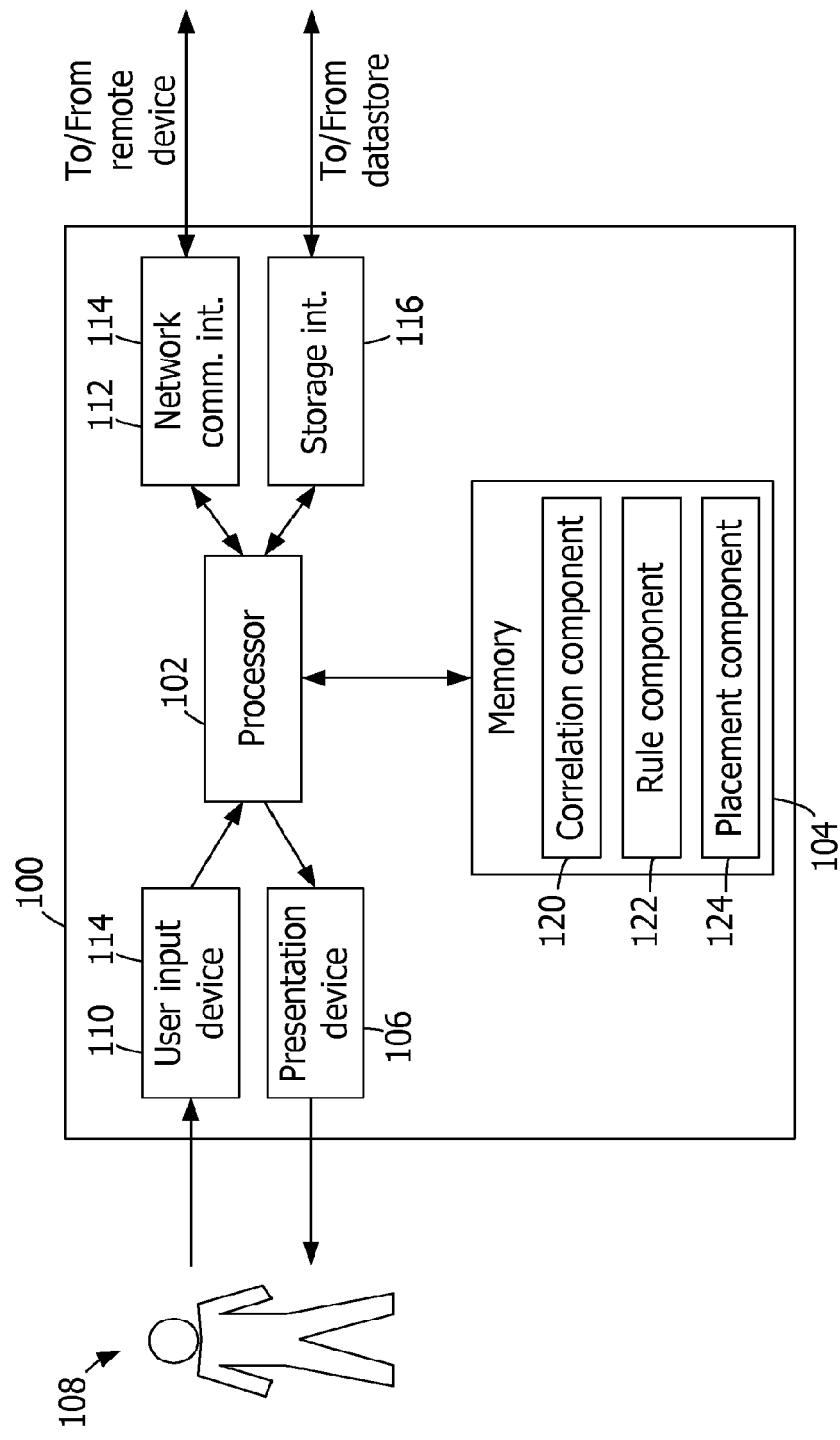
FIG. 1 is a block diagram of an exemplary computing device.

Embodiments described herein facilitate applying data in-flight (DIF) services to individual software applications, such as virtual machines (VMs), without requiring extensive changes to network nodes. Although VMs are specifically discussed below, the techniques described herein are applicable to any software applications, including web services, databases, media streaming software, and/or any other software that exchanges data over a network.

In exemplary embodiments, a DIF service is communicated out-of-band (OOB) with respect to the communication channel(s) to which the DIF services policy applies. For example, a VM may exchange data with a datastore using a storage-specific protocol or communication channel, such as iSCSI or Fibre Channel. A DIF services policy stipulating that such exchanges be encrypted may be communicated using a general purpose packet network that is considered out-of-band relative to the storage-specific protocol or communication channel. Propagating DIF services policies out of band enables VM-specific DIF services without requiring changes to the communication path between a VM and a network node (e.g., storage controller) with which the VM communicates. Further, exemplary embodiments facilitate enforcing a DIF services policy associated with a VM regardless of which host executes the VM. For example, a DIF services policy may be stored in association with a VM in a central depository (e.g., a datastore), included in a VM configuration file, and/or included in a virtual disk image associated with the VM.

As used herein, DIF services refers to configurable attributes, transformations, or manipulations that may be applied to data transmitted between nodes in a network. For example, DIF services may include data integrity, data isolation, data quality of service (QoS), and/or data security.

Data integrity provides protection against corruption of transferred data. Because corruption can be introduced by any node along a communication path, data integrity may be applied along the entire path. Data integrity typically calculates and adds checksums for transmitted data at the source node. Such checksums are validated by nodes along the communication path. This service enables a network operator to prevent corrupt data from being written to a datastore. Data integrity is often applied to data associated with enterprise applications, such as databases. Examples of standard implementations of data integrity include data digest and data integrity field (DIF)/data integrity extensions (DIX).

Data isolation uses input/output (IO) tags to provide isolation of data along a communication path that is shared by multiple users. Network nodes are configured to recognize these tags and prevent unauthorized users from reading the data. Exemplary implementations include VLAN, which may be applied at Layer 2 of the Open Systems Interconnection (OSI) model, and Internet Protocol (IP) address based access control lists, which may be applied at Layer 3 of the OSI model.

Data QoS allocates network resources along a communication path to ensure that a user's or application's performance expectations (e.g., minimum bandwidth and/or maximum latency) are met. An IO pattern (e.g., a source node and/or a destination node) may be associated with a QoS policy at nodes along a communication path. These nodes enforce the QoS policy with respect to data transmissions matching the IO pattern. Exemplary QoS implementations include Data Center Bridging (DCB) and Fibre Channel over Ethernet (FCoE).

Data security protects data against unauthorized data access and network attacks (e.g., "man in the middle" attacks) using authentication and/or encryption services. For example, before data is transferred between endpoint nodes, both nodes may authenticate each other using cryptographic keys. In addition, or alternatively the data may be encrypted at the transmitting node and decrypted at the receiving node. Exemplary data security implementations include Challenge-Handshake Authentication Protocol (CHAP) and Internet Protocol Security (IPsec).

In exemplary embodiments, network nodes advertise or publish DIF services capabilities (e.g., DIF services supported by the nodes) to a server. A policy manager software application allows a user to select a DIF services policy specifying which DIF services to apply to a VM. This policy is stored as metadata associated with the VM. When the VM is executed ("powered on"), data transmitted by the VM is tagged by the host executing the VM based on the DIF services policy. The host also executes a path selection component that routes data to a path that supports the services specified by the DIF services policy associated with the VM. As the data is transmitted along the network nodes along the path, each of the nodes in the path that advertised supported DIF services applies the DIF services policy.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, software applications such as VMs, DIF services policies (e.g., associated with VMs), DIF services supported by network nodes, and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information from a user.

Computing device 100 further includes a storage interface 116 that enables computing device 100 to communicate with one or more datastores, which store virtual disk images, software applications, data associated with software applications, and/or any other data suitable for use with the methods described herein. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes a Embodiments are described herein with reference to virtual machines (VMs). However, it is contemplated that the methods described may be applied to any type of software application.

Figure 2:
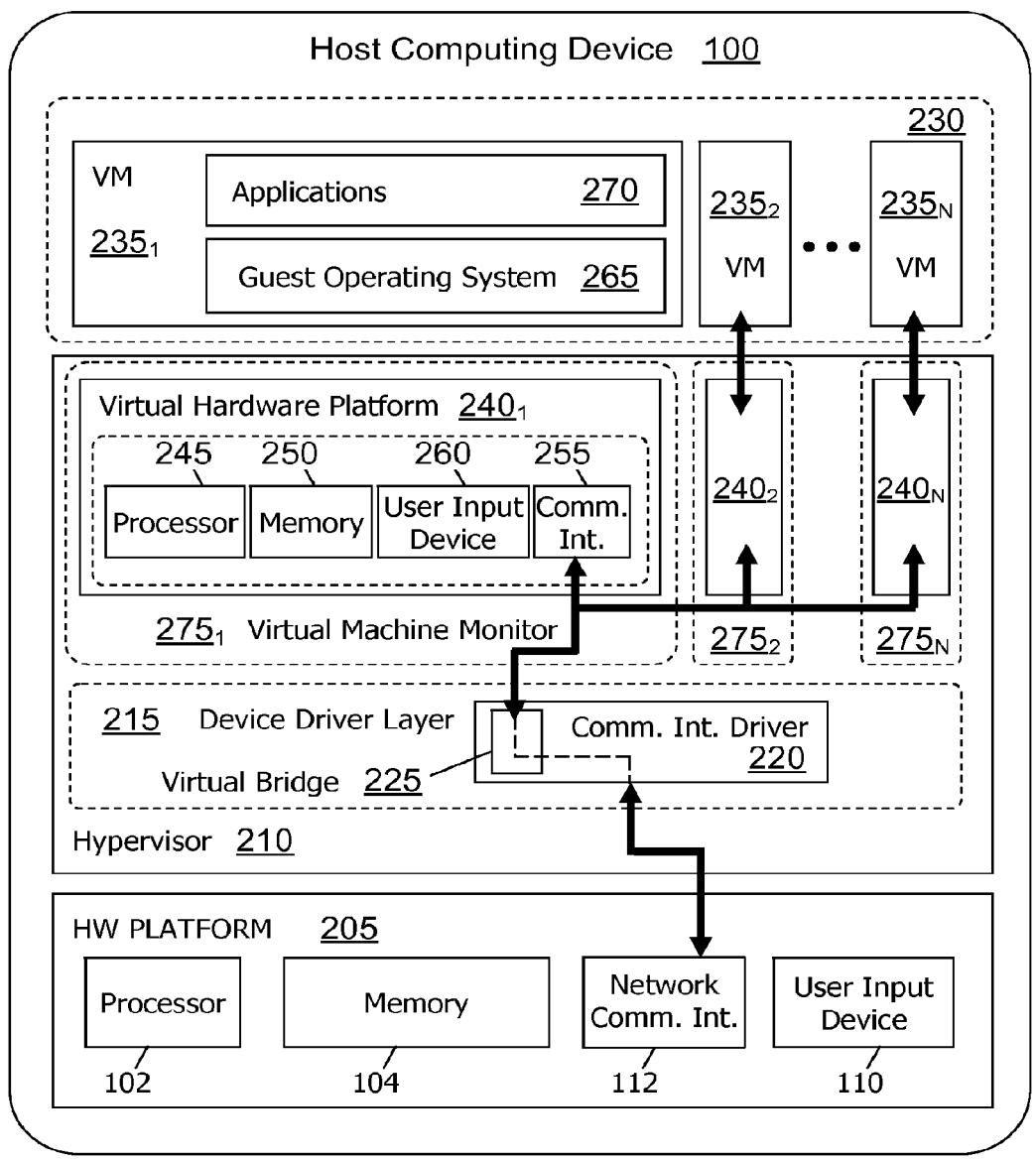
FIG. 2 is a block diagram of virtual machines that are instantiated on a computing device, such as the computing device shown in FIG. 1.

FIG. 2 depicts a block diagram of VMs $235_1$, $235_2$ ... $235_N$ that are instantiated on a computing device 100, which may be referred to as a host computing device or simply a host. Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as a datastore or a data storage container (e.g., in a storage area network, or SAN, configuration).

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode," such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
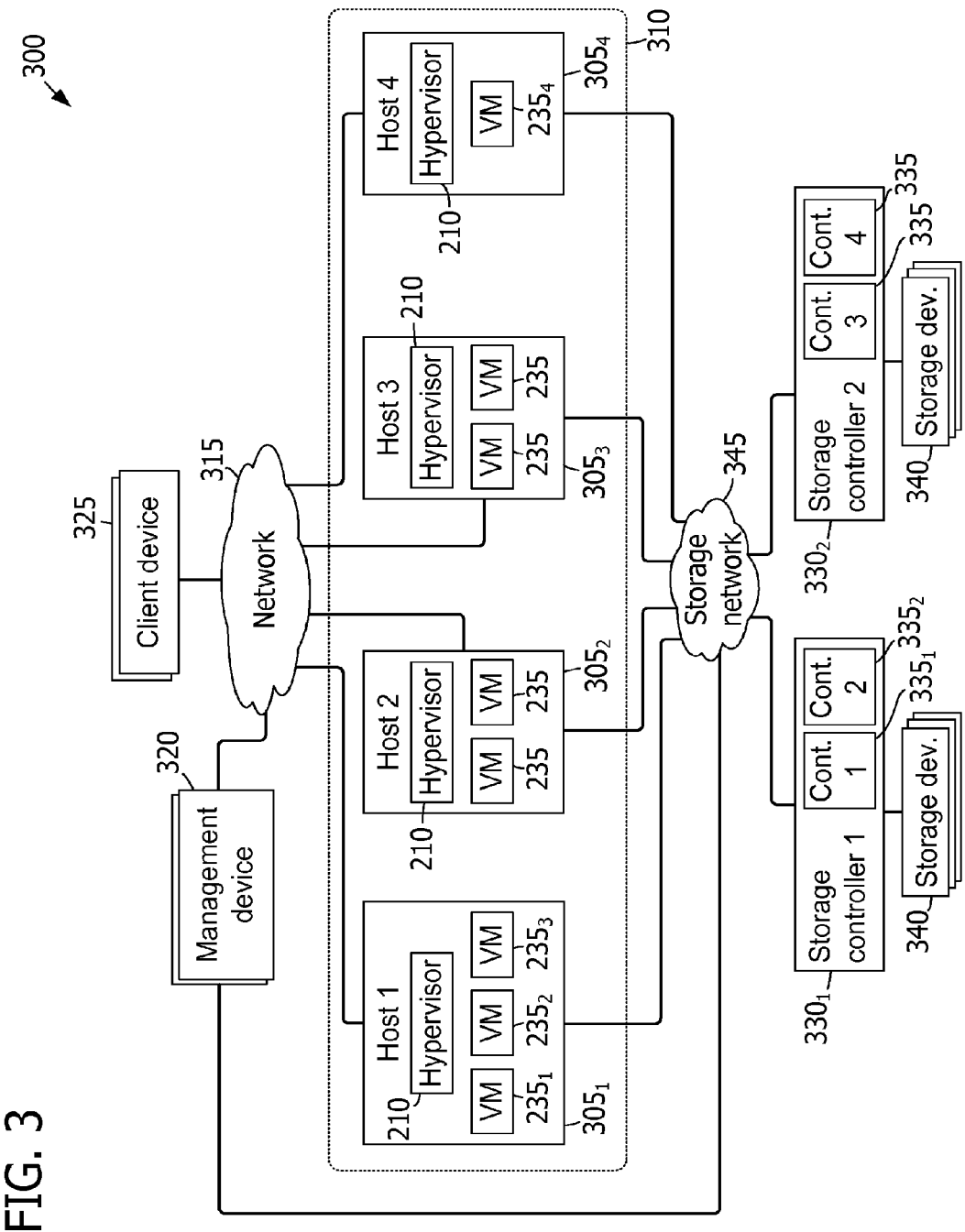
FIG. 3 is a block diagram of an exemplary cluster system of hosts and virtual machines.

FIG. 3 is a block diagram of an exemplary cluster system 300 of hosts 305 and virtual machines (VMs) 235. Cluster system 300 includes a fault domain 310 with a first host $305_1$, a second host $305_2$, a third host $305_3$, and a fourth host $305_4$. Each host 305 executes one or more software applications. For example, first host $305_1$ executes first VM $235_1$, second VM $235_2$, and third VM $235_3$, and fourth host $305_4$ executes fourth VM $235_4$. In exemplary embodiments, each host 305 executes a hypervisor 210, and VMs 235 are executed by the hypervisor 210 on the corresponding host 305. Further, VMs 235 hosted by hosts 305 may execute other software applications, such as instances of network services (e.g., web applications and/or web services), distributed computing software, and/or any other type of software that is executable by computing devices 100 (shown in FIG. 1) such as hosts 305.

Hosts 305 communicate with each other via a network 315. Cluster system 300 also includes one or more management devices 320, which are coupled in communication with hosts 305 via network 315. In exemplary embodiments, a management device 320 monitors and controls hosts 305. For example, management device 320 may monitor performance metrics (e.g., application performance metrics and/or host performance metrics) associated with hosts 305 and may further coordinate the execution of VMs and/or other software applications by hosts 305 based on the performance metrics. One or more client devices 325 are coupled in communication with network 315, such that client devices 325 may submit requests to hosts 305. For example, hosts 305 may execute instances of software applications that provide data in response to requests from client devices 325.

Although management device 320 is shown outside fault domain 310, the functions of management device 320 may be incorporated into fault domain 310. For example, management device 320 may be included in fault domain 310. Alternatively, the functions described with reference to management device 320 may be performed by one or more hosts 305, or VMs 235 executed by one or more hosts 305, in fault domain 310. Hosts 305, management device 320, and/or client device 325 may be computing devices 100.

Cluster system 300 includes a first storage controller 330₁ and a second storage controller 330₂ that provide access to datastores in the form of logical storage containers 335. In exemplary embodiments, storage controllers 330 are instances of computing device 100 (shown in FIG. 1), and storage containers 335 are abstractions of (are "backed by") storage devices 340 (e.g., hard disk drives and/or solid state drives) managed by storage controllers 330. For example, first storage controller 330₁ may provide a first storage container 335₁ and a second storage container 335₂ that are backed by portions of an array of storage devices 340 (e.g., in a redundant array of inexpensive disks, or RAID, configuration).

Hosts 305 communicate with storage controllers 330 via a storage network 345. For example, storage network 345 may include a storage area network (SAN) using a protocol such as Fibre Channel and/or Internet Small Computer System Interface (iSCSI). As another example, storage network 345 may include a network-attached storage (NAS). In exemplary embodiments, VMs 235 are associated with virtual disk images, configuration files, and/or other data stored in file systems provided by storage containers 335. Further, in some embodiments, storage containers 335 provide a VM-specific file system that includes VM volumes, each of which encapsulates data (e.g., configuration and virtual disk images) associated with a VM. Although storage network 345 is illustrated as separate from network 315, in some embodiments, storage network 345 may be combined with network 315.

Figure 4:
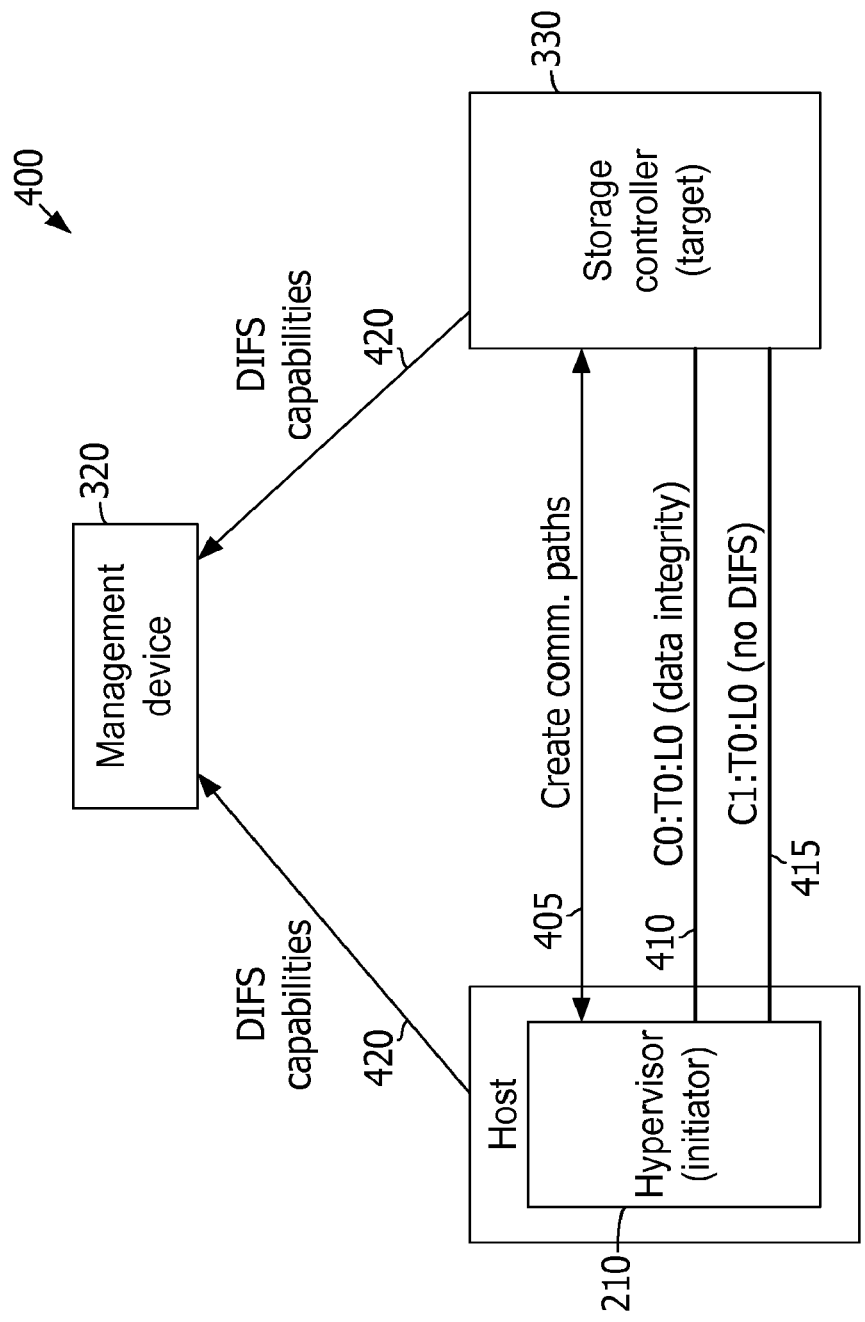
FIG. 4 is a block diagram illustrating the establishment of communication paths in the cluster system shown in FIG. 3.

FIG. 4 is a block diagram 400 illustrating the establishment of communication paths in cluster system 300 (shown in FIG. 3). In exemplary embodiments, a hypervisor 210 operates as, and/or executes, a protocol initiator, and a storage controller 330 operates as, and/or executes, a protocol target. Hypervisor 210 initiates a login process to create 405 a first, or default, communication path 410 between hypervisor 210 and storage controller 330. In some embodiments, default communication path 410 is used by hypervisor 210 and not by VMs executed by hypervisor 210.

In creating 405 default communication path 410, hypervisor 210 and storage controller 330 may negotiate session parameters governing the transmission of data through default communication path 410. Based on the negotiated session parameters, hypervisor 210 and storage controller 330 create 405 one or more other communication paths, such as a second communication path 415, with various attributes corresponding to DIF services supported by hypervisor 210 and storage controller 330. For example, second communication path 415 may include a data integrity service.

Both hypervisor 210 and storage controller 330 transmit 420 to management device 320 an advertisement of DIF services supported by the corresponding component using an out-of-band communication path. For example, referring also to FIG. 3, first communication path 410 and second communication path 415 may be created 405 using storage network 345, and advertisements may be transmitted to management server 320 using network 315. Management device 320 receives the DIF services capability advertisements and associates supported DIF services with each storage controller 330 and each hypervisor 210 (or corresponding host 305) based on the advertisements. This information may be used to determine appropriate DIF services for an IO path, and/or to determine an appropriate host to execute a VM, as described in more detail below.

Although FIG. 4 illustrates a hypervisor 210 and a storage controller 330, it should be noted that management device 320 may also receive DIF services capability advertisements from other components, such as network switches (e.g., OSI Layer 2 switches). For example, management device 320 may receive and store QoS capabilities associated with network switches in storage network 345.

In an exemplary scenario, hypervisor 210 communicates with storage controller 330 using the iSCSI protocol. Hypervisor 210 includes an iSCSI protocol stack and a storage controller driver configured to discover multiple channels of service between hypervisor 210 and storage controller 330. For example, hypervisor 210 may apply data integrity Services for all IO transmitted via first communication path 410 and no services for IO transmitted via second communication path 415. The DIF services associated with communication paths 410, 415 may be determined based on a configuration of hypervisor 210 and/or a configuration (e.g., DIF services policy) of VMs executed by hypervisor 210. Hypervisor 210 may distinguish between communication paths 410, 415 by assigning a unique attribute, such as a channel number, to each communication path 410, 415. As shown in FIG. 4, first communication path 410 is illustrated as a first channel (Channel 0), and second communication path 415 is illustrated as a second channel (Channel 1).

In exemplary embodiments, a VM or a set of VMs is associated with a storage container 335. The application of DIF services to VMs may be implemented as a capability of storage containers 335, potentially along with other capabilities, such as an expected or guaranteed performance level (e.g., IO operations per second). Further, a storage container 335 may provide a plurality of capabilities, DIF services or otherwise. In some embodiments, DIF services are grouped into tiers of service, such as gold, silver, and bronze, or high, medium, and low. For example, gold service may include data integrity and a minimum level of IO operations per second, silver service may include data integrity, and bronze service may include no such capabilities.

Figure 5:
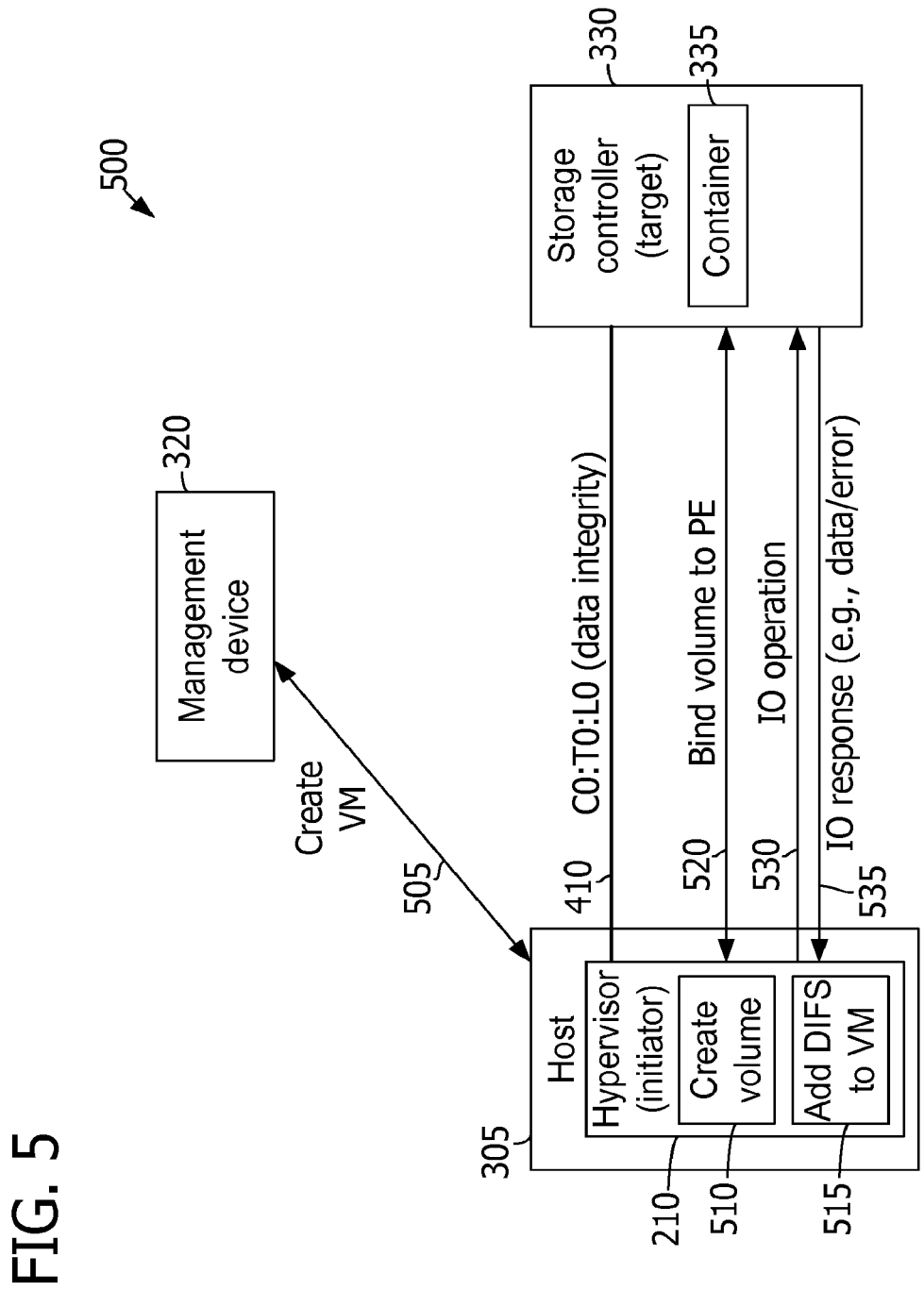
FIG. 5 is a block diagram illustrating the configuration of a virtual machine in the cluster system shown in FIG. 3.

FIG. 5 is a block diagram 500 illustrating the configuration of a VM in cluster system 300 (shown in FIG. 3). In exemplary embodiments, management device 320 receives a request from a user to create a VM associated with a DIF services policy (e.g., including data integrity). Management device determines that hypervisor 210 on host 305 is capable of providing the service(s) indicated by the policy. For example, management device 320 may determine that storage controller 330 provides a storage container 335 supporting data integrity, and that host 305 is capable of communicating with storage controller 330 (e.g., via first communication path 410). Management device 320 transmits 505 a VM creation request to host 305. Hypervisor 210 at host 305 creates 510 a volume (e.g., a VM volume, or VVOL). For example, hypervisor 210 may create 510 a VVOL within container 335 including a virtual disk image and a VM configuration (e.g., metadata) associated with the newly created VM. Hypervisor 210 may also add 515 the DIF services policy, and/or software corresponding to the services indicated by the DIF services policy, to the VM, such as by adding such elements to the virtual disk image.

In some embodiments, management device 320 creates a virtual disk image over a storage container 335 using a protocol endpoint (PE) with the specified DIF services (e.g., data integrity). A PE includes, for example, a device such as a disk that is addressable by a storage controller 330 using a communication protocol (e.g., SCSI or Fibre Channel) supported by the storage controller 330. When the VM is powered on, hypervisor 210 transmits 520 a bind request to the storage controller 330 for the newly created VVOL in storage container 335, both of which support the specified DIF services. In return, hypervisor 210 receives the association of the PE identifier, VVOL identifier, and storage container 335 as part of the binding process 520. The PE is used by hypervisor 210 to transmit data in accordance with the DIF services policy. In exemplary embodiments, the DIF services policy is stored as metadata associated with the VM in the VVOL.

As described in more detail below, hypervisor 210 receives IO operations (e.g., in data packets) from a VM 235 (shown in FIG. 3) executed by hypervisor 210, tags the IO operations, and transmits 530 the tagged IO operations to storage controller 330. Storage controller 330 determines whether the received operation satisfies the DIF services policy associated with the VM 235. When the DIF services policy is satisfied, storage controller 330 performs the received operation and transmits 535 an IO response (e.g., data read from storage container 335 or confirmation that data was successfully written to storage container 335). When the DIF services policy is not satisfied, storage controller 330 rejects the received operation, such as by transmitting 535 an IO response indicating an error.

Figure 6:
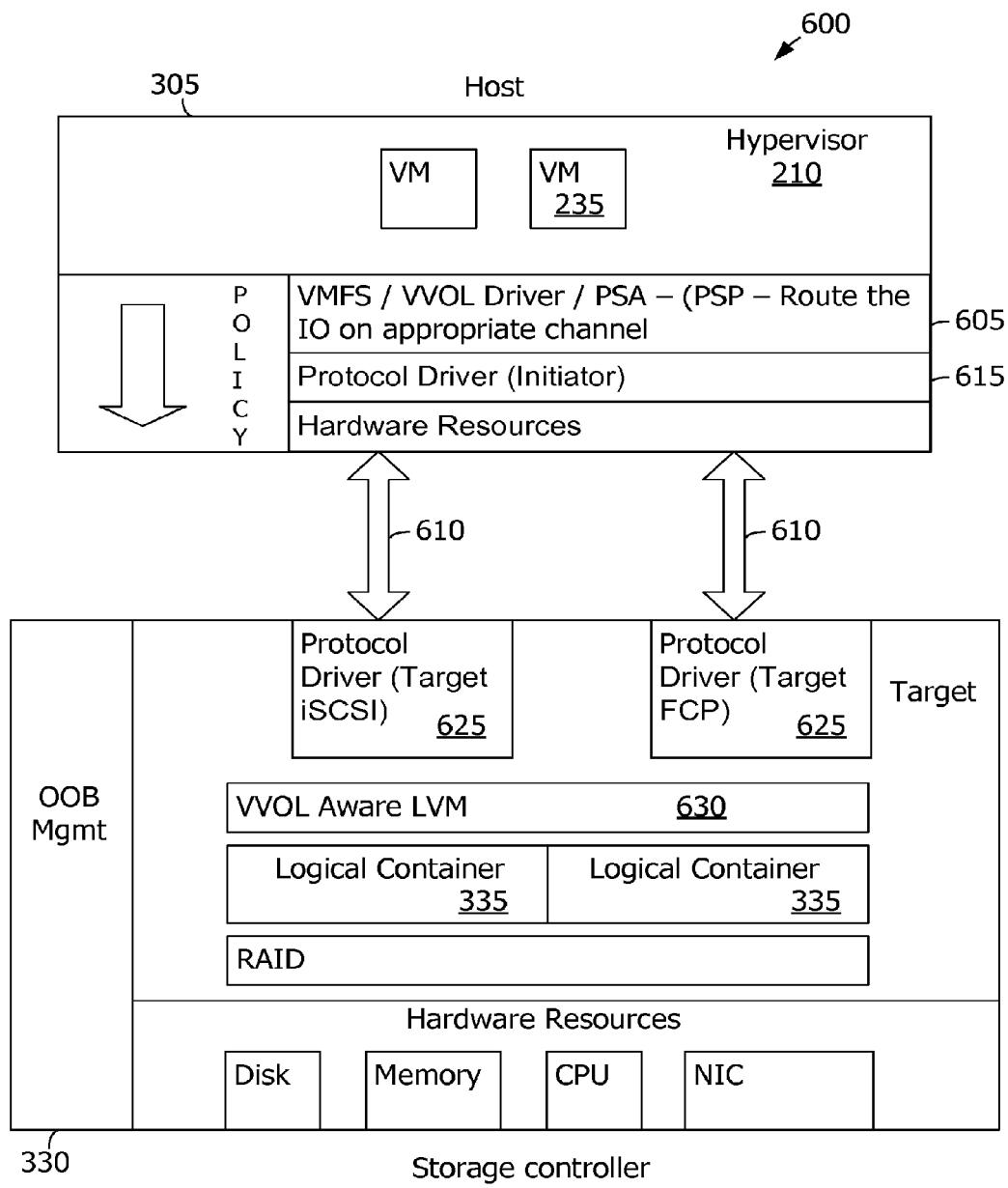
FIG. 6 is a block diagram of components within a host and a storage controller that facilitate transmitting data in accordance with a virtual machine specific DIF services policy.

FIG. 6 is a block diagram 600 of components within a host 305 and a storage controller 330 that facilitate transmitting data in accordance with a VM-specific DIF services policy. In exemplary embodiments, a VM 235 is associated with a DIF services policy specifying one or more DIF services. Hypervisor 210 ensures that data exchanged between the VM 235 and a corresponding storage container 335 is transmitted using a communication path that is appropriate based on the DIF services policy.

When a VM 235 transmits data (e.g., in a packet), hypervisor 210 receives the data and associates with the data one or more tags indicating the DIF services policy associated with the VM 235. A storage stack 605 includes file system drivers and a path selection plugin (PSP). The PSP selects, based on the tag(s), a communication path 610 registered by an underlying protocol driver 615. For example, the PSP may select a communication path 610 that supports the services indicated by the tag(s). The tagged data is transmitted to the target storage controller 330 using the selected communication path 610. When the transmitted data reaches the target storage controller 330, storage controller 330 performs any appropriate services, as indicated by the tag(s), before storing the data in a logical storage container 335.

In one exemplary scenario, host 305 and storage controller 330 communicate using the iSCSI protocol. Each transmission from a VM 235 to storage controller 330 is tagged with the DIF services that are associated with the VM 235. In the exemplary scenario, VM 235 is associated with a DIF services policy specifying data integrity. On a write transmission, a checksum of the data to write may be calculated to facilitate validating the data during transmission ("in-flight") and/or upon arrival at the target. Conversely, on a read transmission, received data may be validated by host 305 by calculating a checksum of the data and comparing the calculated checksum to a checksum received with the data.

Indicated DIF services may be propagated using an asynchronous token ("AsyncToken") scheme. The PSP selects a communication path satisfying the DIF services policy, and the data is communicated using the selected communication path by a protocol driver 615. In some embodiments, protocol driver 615 calculates a checksum for the transmission. In other embodiments, the checksum may be calculated (e.g., by hypervisor 210 or storage stack 605) before protocol driver 615 receives the data. Protocol driver 615 offloads the IO operation to hardware resources 620 (e.g., firmware), transmitting the data and the checksum along the selected communication path 610.

The target storage controller 330 receives the IO at a protocol driver 625. Based on the VM 235 being associated with a DIF services policy including data integrity, storage controller 330 ensures that the received IO satisfies the DIF services policy (e.g., includes a checksum). Storage controller 330 calculates a checksum, and, if the calculated checksum matches the received checksum, stores the data in a logical storage container 335 using a logical volume manager (LVM) 630. In some embodiments, when data integrity is specified, storage controller 330 stores the received data in a format that allows checksum values to be stored with data corresponding to the checksum. For example, if data may conventionally be stored in a 512-byte sector layout, storage controller 330 may store data associated with a VM having a DIF services policy including data integrity in a 520-byte sector layout with an 8-byte checksum field.

The above steps describe a write IO operation. A read IO operation is performed similarly, but in reverse. For example, when data integrity is enabled, the target storage controller 330 may read data requested by the VM 235 and validate the checksum before transmitting the data to host 305.

Further, although storage stack 605 (e.g., the PSP) is responsible for accommodating the DIF services policy in the scenario above, such accommodation may also, or instead, be performed by other components of host 305, such as protocol driver 615. For example, when QoS is indicated by a DIF services policy, protocol driver 615 may set or enable the QoS bit in an IO transmission, and underlying network infrastructure along the selected communication path 610 will apply the QoS policy.

Although the operations above are described with reference to particular devices, it is contemplated that any portion of such operations may be performed by any computing device 100 (shown in FIG. 1). Further, the application of DIF services policies to VMs is described above, but the methods described may be practiced with respect to any software application executed by a host.

Exemplary Implementation

Figure 7:
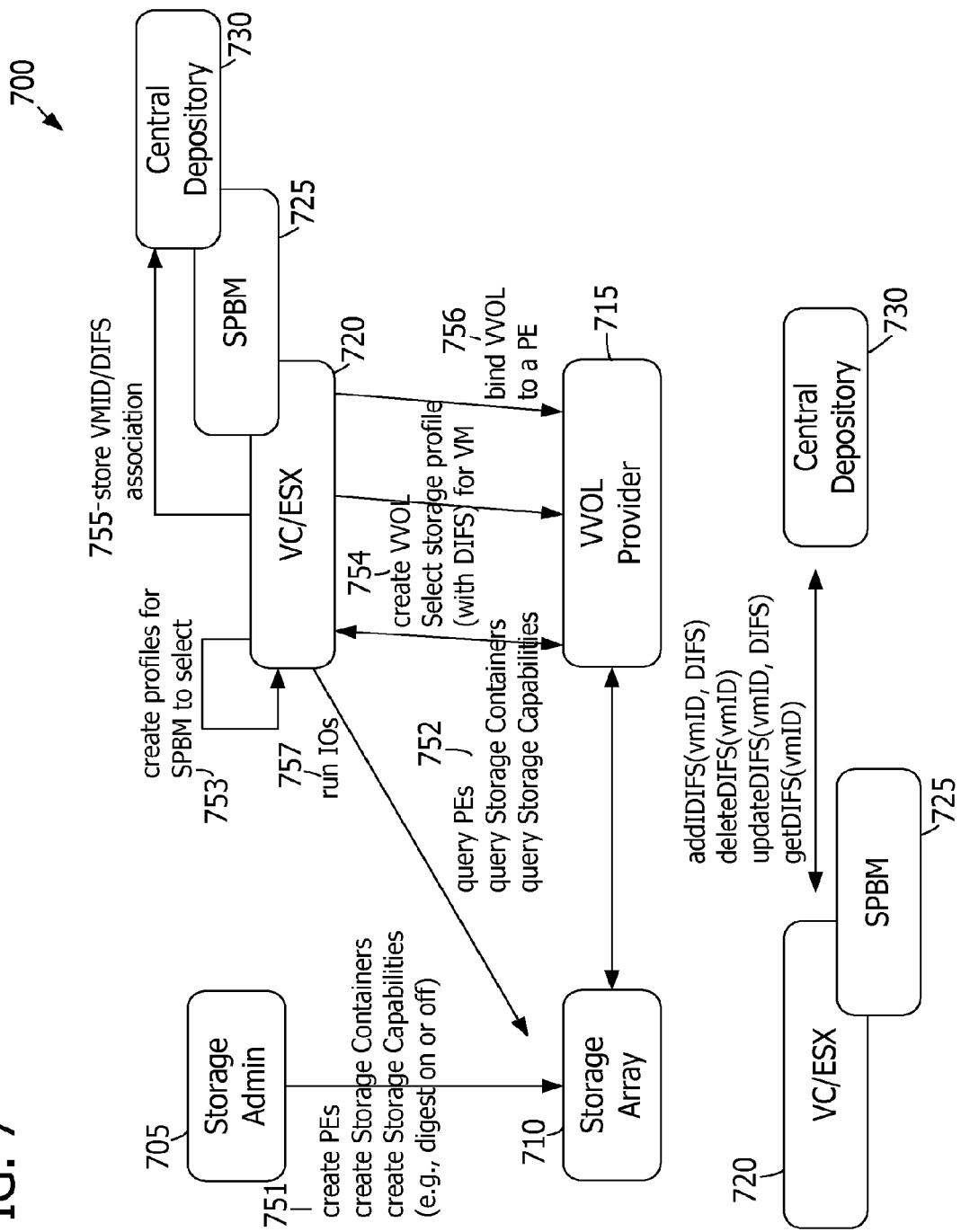
FIG. 7 is a block diagram illustrating a flow of information in accordance with a DIFS policy.
Figure 8:
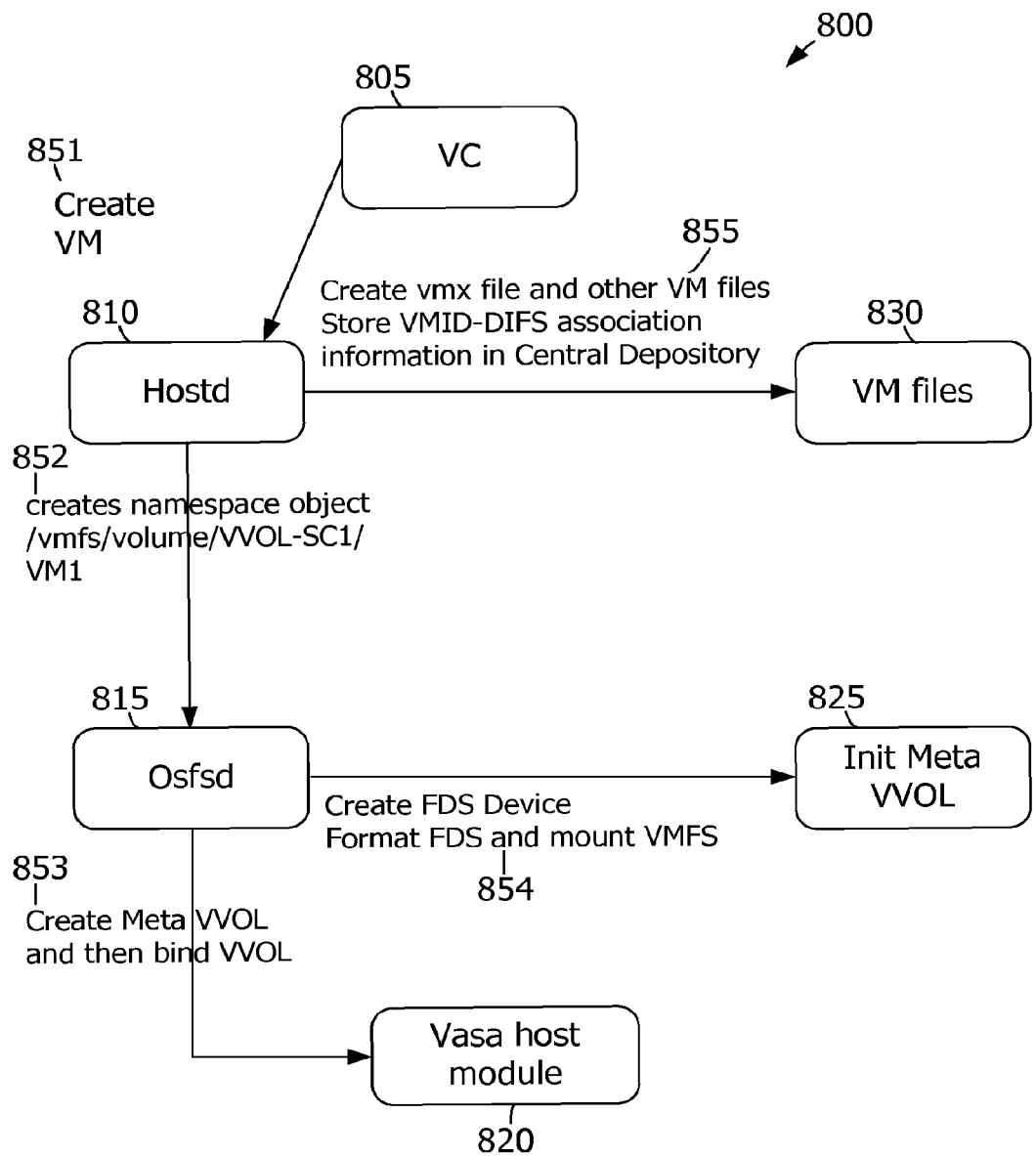
FIG. 8 is a block diagram illustrating the creation of a virtual machine in association with a DIF services policy.
Figure 9:
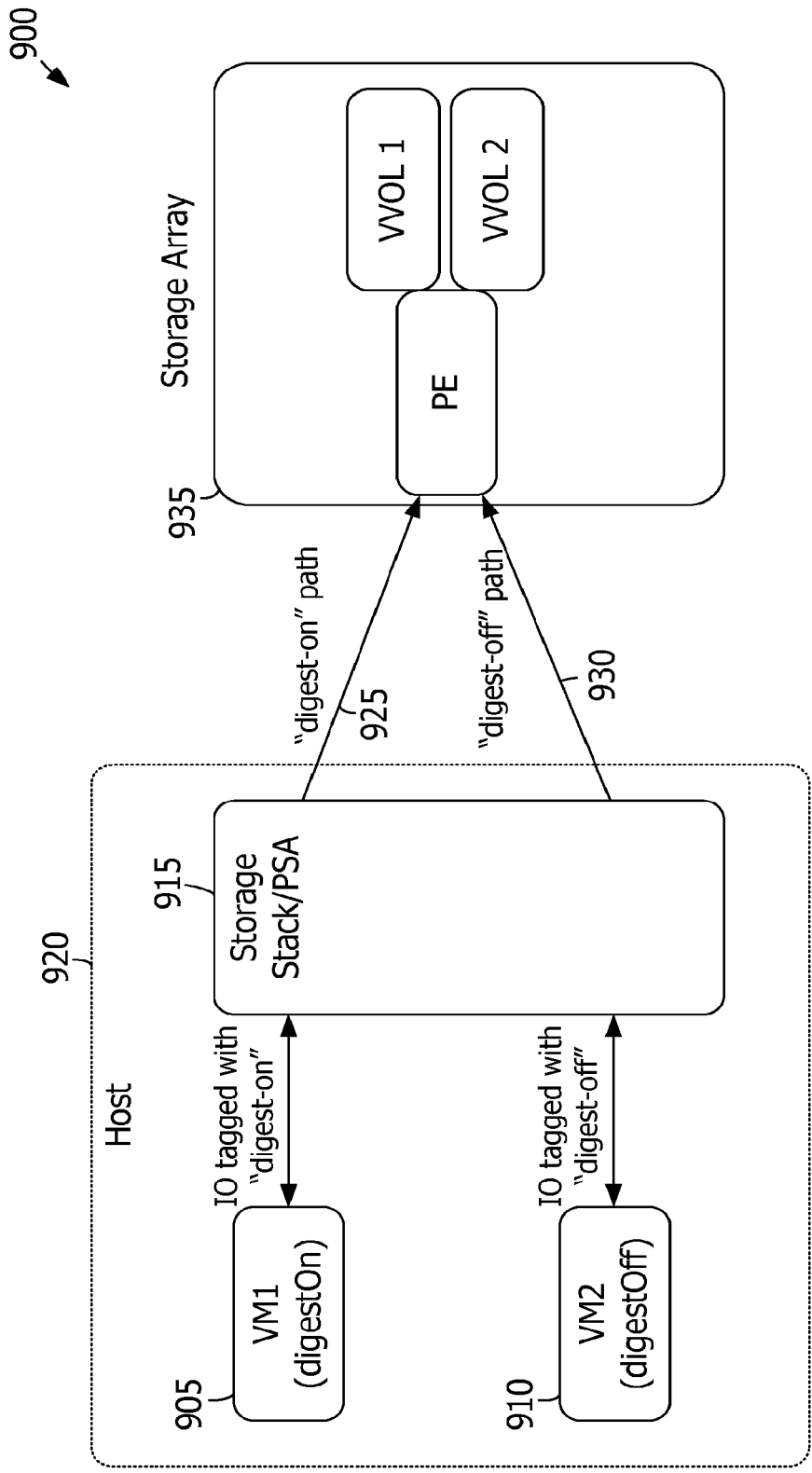
FIG. 9 is a block diagram illustrating the operation of a first VM and a second VM associated with different DIF services policies.

FIGS. 7-9 illustrate an exemplary implementation of the methods described herein. FIG. 7 is a block diagram 700 illustrating a flow of information in accordance with a DIF services policy. As shown in diagram 700, a storage administrator 705 creates 751 PEs, storage containers, and storage capabilities (e.g., DIF services capabilities and/or performance capabilities) associated with storage containers in a storage array 710.

PEs, storage containers, and storage capabilities may be stored by storage array 710 in a VM volume (VVOL) provider 715. A management application VC/ESX 720, which may be executed by management device 320 and/or a host 305 (both shown in FIG. 3), queries 752 the PEs, storage containers, and storage capabilities stored at VVOL provider 715. VC/ESX 720 creates 753 DIF services policies that are available for selection by a storage policy based manager (SPBM) 725, executed by management device 320. For example, the DIF services policies may include individual DIF services policies and/or service tiers, each service tier including zero or more DIF services. A user may be prompted to select a DIF services policy to associate with a given VM, and storage containers matching the selected DIF services policy may be displayed to the user for selection.

At step 754, upon receiving a selection of a policy for a VM from SPBM 725, VC/ESX 720 creates a VVOL within VVOL provider 715 and selects a storage profile (e.g., including a DIF services policy) associated with the VM. VC/ESX 720 associates the storage profile with an identifier of the VM and stores 755 this association in a central depository 730, executed by management device 320. Central depository 730 may, in turn, store the association in the VVOL associated with the VM, in a virtual disk image associated with the VM, and/or in a configuration file associated with the VM. VC/ESX binds 756 the created VVOL to a PE at VVOL provider 715.

In the exemplary implementation, VC/ESX 720 is capable of managing the DIF services policy associated with a VM. For example, VC/ESX 720 may manage DIF services policies in response to user requests received by SPBM 725. To associate a DIF services policy with a new VM, VC/ESX 720 executes an addDIFS( ) function against central depository 730, providing a VM identifier and a DIF services policy. To remove the DIF services policy from a VM, VC/ESX 720 executes a deleteDIFS( ) function against central depository 730, providing a VM identifier. To modify the DIF services policy associated with a VM, VC/ESX 720 executes an updateDIFS( ) function against central depository 730, providing a VM identifier and a new DIF services policy. To retrieve the DIF services policy currently associated with a VM, VC/ESX 720 executes a getDIFS( ) function against central depository 730, providing a VM identifier.

FIG. 8 is a block diagram 800 illustrating the creation of a VM in association with a DIF services policy. As shown in diagram 800, a management application VC 805, executed by management device 320 (shown in FIG. 3), transmits 851 a create VM command to a VM management agent hostd 810, executed by a host 305 (shown in FIG. 3). Hostd 810 creates 852 a namespace object associated with the VM using a file system agent osfsd 815. "Osfsd" refers to "Object Store File System Daemon.' In the exemplary implementation, osfsd 815 creates 853 a meta VVOL and binds the VVOL to the VM using an application programming interface (API) for storage awareness (VASA) host module 820. Osfsd 815 also creates 854 a file-interface deduplication system (FDS) device, formats the FDS device, and mounts a VM file system (VMFS) using an initialize meta VVOL process 825. At step 855, hostd 810 creates files 830 associated with the VM (e.g., a VM configuration file) and stores an association of an identifier of the VM (a VMID) with a specified DIF services policy in a central depository (e.g., central depository 730, shown in FIG. 7).

FIG. 9 is a block diagram 900 illustrating the operation of a first VM 905 and a second VM 910 associated with different DIF services policies. First VM 905 is associated with a DIF services policy indicating data integrity is to be applied. Second VM 910 is associated with a DIF services policy indicating no DIF services.

First VM 905, second VM 910, and a storage stack 915 (similar to storage stack 605, shown in FIG. 6) are executed by a host 920. Storage stack 915 creates a first communication path 925 and a second communication path 930 between host 920 and a storage array 935. Data integrity, in the form of a digest, is enabled for first communication path 925. No data integrity is enabled for second communication path 930.

When VMs 905, 910 are powered on, storage stack 915 tags data transmitted by VMs 905, 910 based on the DIF services policies associated with VMs 905, 910. Because data integrity is enabled in the DIF services policy associated with first VM 905, IO from first VM 905 is exchanged with storage array 935 using first communication path 925. Because no data integrity is enabled in the DIF services policy associated with second VM 910, IO from second VM 910 is exchanged with storage array 935 using second communication path 930. Accordingly, the computing overhead of calculating and validating checksums is incurred only for first VM 905.

The methods described may be performed by computing devices 100 (shown in FIG. 1), such as management device 320 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a memory associated with a computing device, the memory storing a plurality of data in-flight (DIF) services policies; and
   at least one processor associated with the computing device, the processor programmed to:
   receive an advertisement of one or more DIF services supported by each network node of a plurality of network nodes, wherein the plurality of network nodes includes a plurality of hosts;
   receive, from a user via a user interface, a selection of at least one of the plurality of DIF services policies stored in the memory, the at least one of the plurality of DIF services policies indicating one or more DIF services to apply to a data packet transmitted by a virtual machine (VM) along a communication path comprising one or more of the plurality of network nodes that support the at least one of the plurality of DIF services policies;
   select, from the plurality of hosts, based on the received advertisements and the selection of the at least one of the plurality of DIF services policies, a host to execute the VM, the selected host determined to be communicatively coupled to the one or more of the plurality of network nodes along the communication path that support the at least one of the plurality of DIF services policies, wherein the selected host supports DIF services indicated by the at least one of the plurality of DIF services policies; and
   assigning an identifier to the at least one of the plurality of DIF services policies,
   the assigned identifier being used by the one or more of the plurality of network nodes along the communication path to apply the one or more DIF services for the VM upon determining the VM is associated with the assigned identifier.

2. The system of claim 1, wherein the processor is programmed to select the host at least in part by determining that the host supports DIF services indicated by the at least one of the plurality of DIF services policies.

3. The system of claim 2, wherein the processor is programmed to select the host by further determining that the communication path supporting the DIF services indicated by the at least one of the plurality of DIF services policies exists between the host and a datastore.

4. The system of claim 1, wherein the processor is further programmed to store the at least one of the plurality of DIF services policies in association with an identifier of the VM or in a configuration file associated with the VM.

5. The system of claim 1, wherein the processor is further programmed to store the at least one of the plurality of DIF services policies in a virtual disk image associated with the VM.

6. The system of claim 1, wherein the processor is programmed to receive the at least one of the plurality of DIF services policies including one or more of the following elements: data integrity, data isolation, data quality of service (QoS), and data security.

7. The system of claim 1, wherein the processor is further programmed to:
   prompt the user to select a service tier from a plurality of service tiers, wherein at least one service tier from the plurality of service tiers includes a plurality of DIF services; and
   wherein receiving the selection of the at least one of the plurality of DIF services policies comprises receiving a selection of a service tier from the plurality of service tiers.

8. The system of claim 1, wherein the processor is further programmed to:
   identify a plurality of communication paths to a destination, wherein each communication path of the plurality of communication paths is associated with one or more DIF services; and
   select the communication path from the plurality of communication paths based on the at least one of the plurality of DIF services policies associated with the VM, wherein the data packet is transmitted along the selected communication path.

9. A method comprising:
   receiving, by a management device, an advertisement of one or more data in-flight (DIF) services supported by network nodes of a plurality of network nodes, wherein the plurality of network nodes includes a plurality of hosts;
   receiving, from a user via a user interface, a selection of a DIF services policy indicating one or more of the DIF services to apply to at least one data packet transmitted by a software application along a communication path comprising one or more of the plurality of network nodes that support the selected DIF services policy;
   based on the received advertisements and the selection of the DIF services policy, selecting, by the management device, a host from the plurality of hosts to execute the software application, the selected host determined to be communicatively coupled to the one or more of the plurality of network nodes along the communication path that support the selected DIF services policy, wherein the selected host supports DIF services indicated by the selected DIF services policy; and assigning an identifier to the selected DIF services policy, the assigned identifier being used by the one or more of the plurality of network nodes along the communication path to apply the one or more DIF services for the software application upon determining the software application is associated with the assigned identifier.

10. The method of claim 9, wherein selecting the host comprises determining that the host supports DIF services indicated by the selected DIF services policy.

11. The method of claim 10, wherein selecting the host comprises determining that the communication path supporting the DIF services indicated by the selected DIF services policy exists between the host and a datastore.

12. The method of claim 9, further comprising storing the selected DIF services policy in association with an identifier of the software application or in a configuration file associated with the software application.

13. The method of claim 9, wherein the software application is a virtual machine (VM), and wherein the method further comprises storing the selected DIF services policy in a virtual disk image associated with the VM.

14. The method of claim 9, further comprising:
prompting the user to select a service tier from a plurality of service tiers, wherein the service tier includes a plurality of DIF services; and
wherein receiving the selection of the DIF services policy comprises receiving a selection of a service tier from the plurality of service tiers.

15. One or more non-transitory computer-readable storage media having computer-executable instructions embodied thereon, wherein when executed, the computer-executable instructions cause at least one processor to:
receive, by a management device, an advertisement identifying data in-flight (DIF) services supported by each network node of a plurality of network nodes, wherein the plurality of network nodes includes a plurality of hosts;
receive, from a user via a user interface, a selection of a DIF services policy indicating one or more of the DIF services to apply to at least one data packet transmitted by a software application along a communication path comprising one or more of the plurality of network nodes that support the selected DIF services policy;
based on the received advertisements and the selection of the DIF services policy, select, by the management device, a host from the plurality of hosts to execute the software application, the selected host determined to be communicatively coupled to the one or more of the plurality of network nodes along the communication path that support the selected DIF services policy, wherein the selected host supports the one or more of the DIF services indicated by the selected DIF services policy; and assigning an identifier to the selected DIF services policies,
the assigned identifier being used by the one or more of the plurality of network nodes along the communication path to apply the one or more DIF services for the software application upon determining the software application is associated with the assigned identifier.

16. The non-transitory computer-readable storage media of claim 15, wherein the computer-executable instructions cause the at least one processor to select the host at least in part by determining that the host supports the one or more of the DIF services indicated by the selected DIF services policy.

17. The non-transitory computer-readable storage media of claim 16, wherein the computer-executable instructions cause the at least one processor to select the host by further determining that the communication path supporting the one or more of the DIF services indicated by the selected DIF services policy exists between the host and a datastore.

18. The non-transitory computer-readable storage media of claim 15, wherein the computer-executable instructions further cause the at least one processor to store the selected DIF services policy in association with an identifier of the software application or in a configuration file associated with the software application.

19. The non-transitory computer-readable storage media of claim 15, wherein the software application is a virtual machine (VM), and the computer-executable instructions further cause the at least one processor to store the selected DIF services policy in a VM volume containing a virtual disk image associated with the VM.

20. The non-transitory computer-readable storage media of claim 15, wherein the computer-executable instructions further cause the at least one processor to:
prompt the user to select a service tier from a plurality of service tiers, wherein at least one service tier from the plurality of service tiers includes a plurality of DIF services; and
wherein receiving the selection of the DIF services policy comprises receiving a selection of a service tier from the plurality of service tiers.

* * * * *